Patented Sept. 14, 1926.

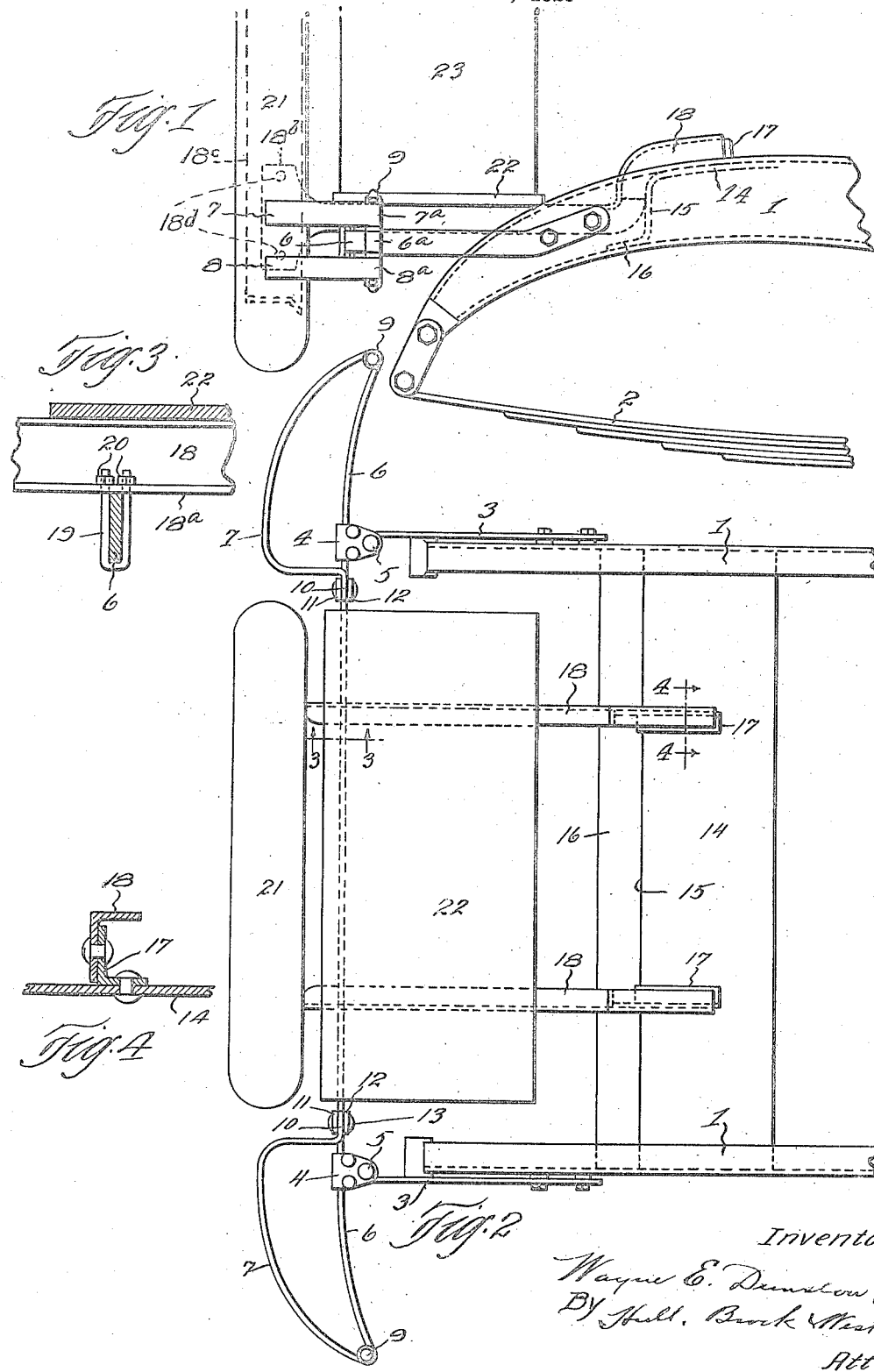

1,599,559

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

COMBINED BUMPER, TIRE CARRIER, AND TRUNK RACK.

Application filed October 27, 1923. Serial No. 671,096.

This invention relates to a combined bumper, trunk rack, and tire carrier, and has for its general object to provide a construction and arrangement of the parts of a device of this character which will enable the three functions referred to to be realized in an efficient manner and in a compact, strong, and serviceable structure. A further object of the invention is to provide a device of this kind which may be conveniently applied to the frame of an automobile and be firmly supported therefrom.

Further and more limited objects of the invention will be referred to in the specification and will be realized in and through the combinations of elements set forth in the claims appended thereto.

In the drawings, Fig. 1 represents a side elevation of the rear portion of the frame of an automobile showing my invention applied thereto;

Fig. 2, a plan view of the parts shown in Fig. 1; and

Figs. 3 and 4, sectional details corresponding respectively to the lines 3—3 and 4—4 of Fig. 2.

Describing the various parts by reference characters, 1 denotes the rear end portions of the ordinary side members or sills of an automobile, the said members or sills being shown as directed downwardly at their rear ends and constituting hangers for the rear ends of the springs 2. The members 1 are shown as of ordinary channel construction.

Secured to the rear portions of the sills or members 1 are arms 3, each having an eye at its rear end to which a clamp 4 is pivotally secured by means of a bolt 5, the clamps engaging the bar 6 of a bumper.

For convenience of description, the bar 6 will be referred to as a "front" bar, for the reason that the bumper is applied to the rear end of the bumper, it being obvious that, if the bumper were applied to the front of the automobile, the bar 6 would then be a "rear" bar. The bumper shown herein is substantially indentical with that described and claimed in the patent of Christian Girl and Wayne E. Dunston, No. 1,476,605, issued Dec. 4, 1923 comprising, in addition to the bar 6, two sets of short upper and lower bars 7 and 8 each having an eye at its end and adapted to be connected to the corresponding ends of the bar 6 by means of bolts 9 extending through eyes $6^a$ at opposite ends of the bar 6 and through eyes $7^a$ and $8^a$ at the ends of the bars 7 and 8, respectively, it being noted that the eyes $6^a$ are interposed between their respective cooperating eyes $7^a$ and $8^a$.

The bars 7 and 8 project rearwardly with respect to the bar 6 and are then bent forwardly or toward the bar 6, the extreme inner ends of the bars 7 and 8 being located above and below the bar 6, respectively, and preferably being extended in the vertical plane of such bar 6, as indicated at 10. The ends 10 are conveniently secured to the bar 6 by means of clamping plates 11 and 12 and rivets 13.

14 denotes the upper portion, 15 the vertical portion, and 16 the lower portion of a cross member which is secured to and between the side sills or members 1. This cross member may be, as indicated, of sheet metal and in the shape of a skirt or apron the wide upper portion or flange 14 whereof is fitted beneath and secured to the upper flanges of the channel side members 1, while the shorter lower flange 16 of such skirt or apron is secured to the lower flanges of such side members.

Riveted to the upper flange 14 of this cross member are a pair of laterally spaced angle bars 17, the rear ends of the bars being bent downwardly to engage the vertical flange 15 of the cross member. Riveted in turn to the vertical flanges of these angle bars are the channel bar arms 18. The lower flange of each of the arms 18 is cut away, or removed, where such arm overlaps and is secured to its supporting bar 17. The front ends of the arms 18 are also bent to conform to the shape of the bar 17. The lower flange $18^a$ of each of the arms extends across and rests upon the bar 6, each arm 18 being secured to said bar by means of a U-bolt 19 embracing the said bar and having its ends projecting through the flange $18^a$ and there provided with the nuts 20. The arms 18 extend beyond the bar 6 and support a tire carrier of any standard construction indicated in dotted lines in Fig. 1, which tire carrier in turn supports the tire 21. The arms 18 may, in practice, be widened and suitably shaped (as indicated in dotted lines at $18^b$, Fig. 1) to be riveted to and within a tire carrier of the ordinary demountable rim type, indicated in dotted lines at $18^c$ in Fig. 1, which is the standard equipment with a number of different makes of automobiles.

The rivets are indicated on said view at 18ᵈ. The arms 18 are shown as supporting a rack or platform 22 on which a trunk 23 may be mounted.

Through the construction shown and described herein, I am enabled to combine a trunk-rack carrier and a tire carrier with a bumper in such manner that the trunk rack and carrier will be sufficiently supported, through the bumper, from the side members or sills of the automobile, as well as being supported by the cross sill or member. The manner of supporting the outer ends of the arms 18 enables me to use light stock therefor and prevents the parts from rattling.

It will be obvious that the particular construction of the bumper may be varied, the one shown herein providing a recess between the fender guard portions thereof for the tire carrier and tire.

What I claim is:—

1. The combination, with the side members of a vehicle and a cross member connected thereto, of a pair of arms secured to said side members, a bumper supported by said arms, and a pair of tire-carrier supporting arms each supported at its inner end from the cross member and each projecting beyond and secured to said bumper, and a trunk rack or platform carried by said last mentioned arms.

2. The combination, with the side members of a vehicle, of a bumper supported by said members, a tire-carrier support projecting rearwardly from said vehicle and secured to said bumper, and a trunk rack or platform supported by said carrier support.

3. The combination, with the side members of a vehicle and a cross member extending between and connected thereto, of bumper supporting arms secured to the side members, a bumper secured to said arms, and a combined trunk-and-tire-supporting device secured at its inner end to the cross member and extending beyond and secured to the said bumper.

4. The combination, with the side members of a vehicle and a cross member extending between and connected thereto, of a bumper supported by said side members, and a combined trunk-and-tire-supporting device secured at its inner end to the cross member and extending beyond and secured to the said bumper.

5. The combination, with the side members of a vehicle and a cross member connecting said side members, of a pair of bumper supporting arms each secured to a side member, a bumper supported by said arms, a pair of tire-carrier supporting arms each secured at its inner end to the cross member and each extending beyond the bumper and secured thereto, and a trunk rack or platform mounted on the last mentioned arms intermediate the ends thereof.

6. The combination, with the side members of a vehicle, of a pair of bumper-supporting arms each secured to a side member, a bumper supported by said arms, a tire carrier support projecting rearwardly from the vehicle and extending beyond the bumper and secured thereto, and a trunk rack or platform mounted on the said support intermediate the ends thereof.

7. The combination, with the side members of a vehicle and a cross member connected thereto, of a pair of bumper supporting arms each secured to a side member, a bumper comprising a bar secured to and extending between the said arms, the said bumper having at each end thereof a rearwardly projecting portion forming with such bar a fender guard, a pair of arms each secured at its inner end to the cross member and each extending across and beyond the said bar and secured thereto, a trunk rack or platform carried by the last-mentioned arms, intermediate the ends thereof, and a tire carrier mounted on the outer end of said arms in the space between the fender guards.

8. The combination, with the side members of a vehicle, of a bumper secured to and extending between the said members, the said bumper having intermediate the ends thereof a forwardly projecting recess for the reception of a tire carrier, a tire-carrier support projecting from the rear of the vehicle, across said bumper and into said recess, and a tire carrier in said support in said recess.

9. The combination, with the side members of a vehicle, of a bumper secured to and extending between said members, said bumper having a forwardly projecting recess for the reception of a tire carrier, a support for said carrier projecting rearwardly from said vehicle and across and secured to said bumper, a tire carrier on said support in said recess, and a trunk rack or platform on said support in front of said bumper.

10. The combination, with the side members of a vehicle, of a bumper supported from said side members, and a support for a tire carrier projecting from the vehicle, between the side members, and attached to said bumper.

11. The combination, with the side members of a vehicle and a cross member connecting said side members, of a bumper supported from said side members, and a tire carrier support supported at its inner end by said cross member and at its outer end by said bumper.

12. The combination, with the side members of a vehicle and a cross member connecting said side members, of a bumper supported by said side members, and one or more tire-supporting arms, each supported at its inner end by said cross member and each connected, adjacent to its outer end to said bumper.

13. The combination, with the side members of a vehicle and a cross member connected to said members, of bumper-supporting arms secured to said side members, respectively, a bumper supported by said arms, a pair of arms each secured at its inner end to the cross member and extending across and secured to the bumper, and a trunk rack or platform mounted on the last mentioned arms.

In testimony whereof, I hereunto affix my signature.

WAYNE E. DUNSTON.